(12) United States Patent
Tsao et al.

(10) Patent No.: US 9,239,597 B2
(45) Date of Patent: Jan. 19, 2016

(54) EJECTING APPARATUS AND ELECTRONIC DEVICE EMPLOYING THE EJECTING APPARATUS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Tai-An Tsao, New Taipei (TW); Hung-Ming Chen, New Taipei (TW); Hsieh-Chih Chiang, New Taipei (TW); Xiao-Yu Liu, Shenzhen (CN)

(73) Assignees: HONG FU JIN PRECISION INDUSTRY (ShenZhen) CO., LTD., Shenzhen (TW); HON HAI PRECISION INDUSTRY CO., LTD., New Taipei (TW)

( * ) Notice: Subject to any disclaimer, the term of this patent is extended or adjusted under 35 U.S.C. 154(b) by 112 days.

(21) Appl. No.: 14/226,964

(22) Filed: Mar. 27, 2014

(65) Prior Publication Data
US 2014/0293524 A1 Oct. 2, 2014

(30) Foreign Application Priority Data
Apr. 1, 2013 (CN) .......................... 2013 1 0109564

(51) Int. Cl.
*G06F 1/16* (2006.01)
(52) U.S. Cl.
CPC ..................................... *G06F 1/1675* (2013.01)
(58) Field of Classification Search
CPC .................................................. G06F 1/1675
See application file for complete search history.

(56) References Cited

U.S. PATENT DOCUMENTS

| | | | | |
|---|---|---|---|---|
| 5,474,463 A * | 12/1995 | Robinson | ........... | G06K 13/0806 361/679.32 |
| 6,945,797 B2 * | 9/2005 | Obara | .................. | H01R 13/629 361/679.32 |
| 6,992,886 B2 * | 1/2006 | Salinas | .................. | G06F 1/184 361/679.38 |
| 7,118,396 B2 * | 10/2006 | Ting | .................. | H01R 13/6581 439/159 |
| 7,540,778 B2 * | 6/2009 | Cheng | .............. | H01R 13/65802 439/181 |
| 7,789,683 B2 * | 9/2010 | Ting | ..................... | H05K 5/0265 439/159 |
| 8,371,878 B2 * | 2/2013 | Tang | .................... | H04B 1/3816 439/630 |
| 8,984,743 B2 * | 3/2015 | Deng | ................... | H04B 1/3816 29/225 |
| 2006/0092604 A1 * | 5/2006 | Ting | ........................ | G06F 1/183 361/679.4 |
| 2013/0063910 A1 * | 3/2013 | Chao | ..................... | G06F 1/1656 361/754 |

* cited by examiner

*Primary Examiner* — Lisa Lea Edmonds
(74) *Attorney, Agent, or Firm* — Novak Druce Connolly Bove + Quigg LLP (57) ABSTRACT

An electronic device comprises a main body, a plurality of I/O interfaces, and an ejecting apparatus. The ejecting apparatus is mounted on the main body and comprises an enclosure, a supporting member received in the enclosure, a carrier secured on the supporting member to support the I/O interfaces, a first driving unit, and a second driving unit. The first driving unit drives the carrier to slide along a first direction, and the second driving unit drives the carrier to slide along a second direction opposite to the first direction. When the I/O interfaces are exposed out of the enclosure, the first force is larger than the second force. When the carrier is operated to slide to a position where the second force is larger than the first force, the I/O interfaces are driven to be received in the enclosure.

20 Claims, 13 Drawing Sheets

EJECTING APPARATUS AND ELECTRONIC DEVICE EMPLOYING THE EJECTING APPARATUS

FIELD

The present disclosure relates to an ejecting apparatus, and particularly to an ejecting apparatus employed by an electronic device.

BACKGROUND

Input/output (I/O) interfaces, such as USB interfaces and HDMI interfaces, are found in electronic devices, such as computers and displays. The electronic devices define openings in their enclosures, so as to expose the I/O interfaces. However, the exposed I/O interfaces are easy to be contaminated by dust.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Reference will be made to the drawings to describe various embodiments.

Figure 1:
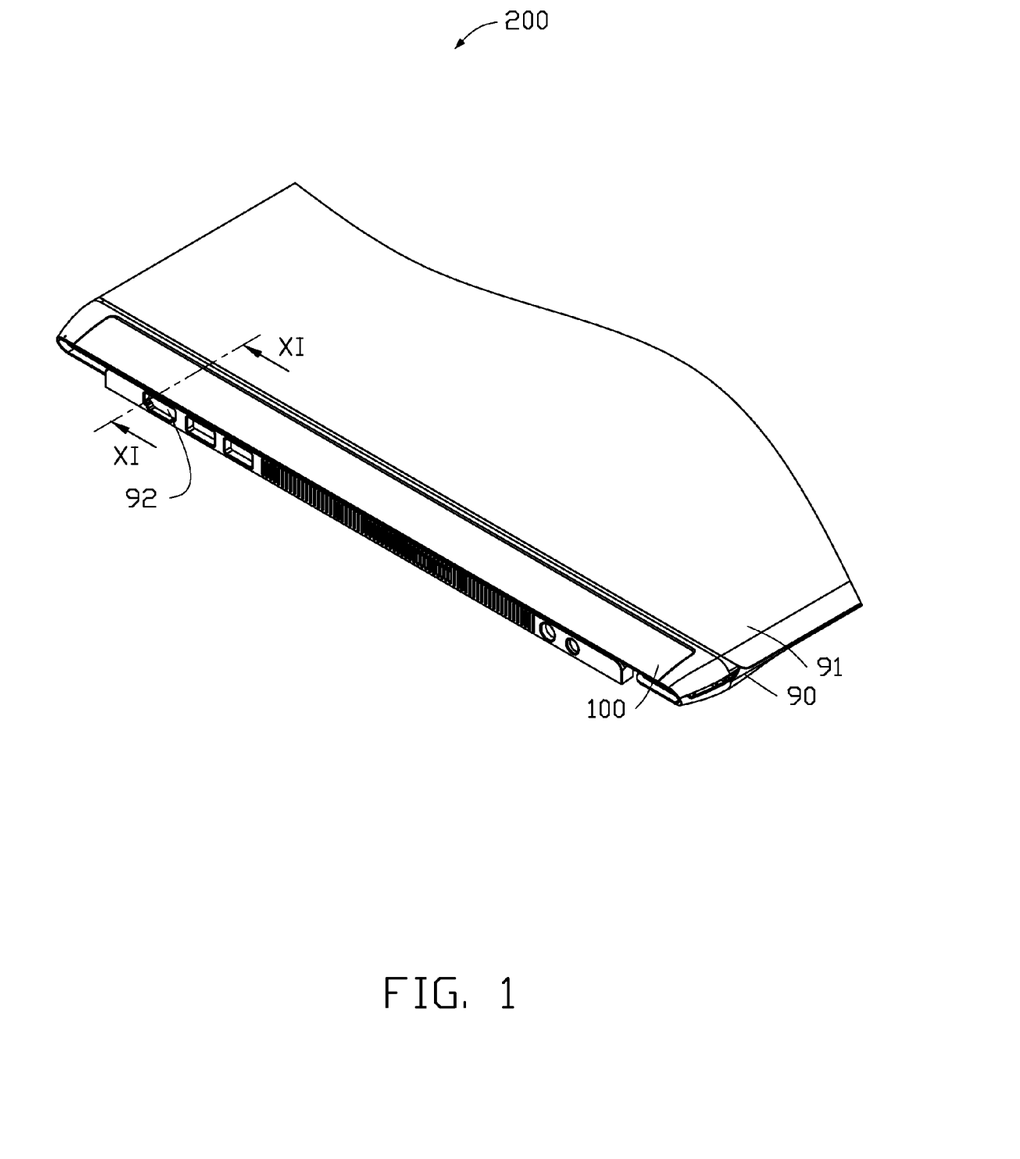
FIG. 1 is an isometric view of an embodiment of an ejecting apparatus of an electronic device when I/O interfaces are exposed.
Figure 2:
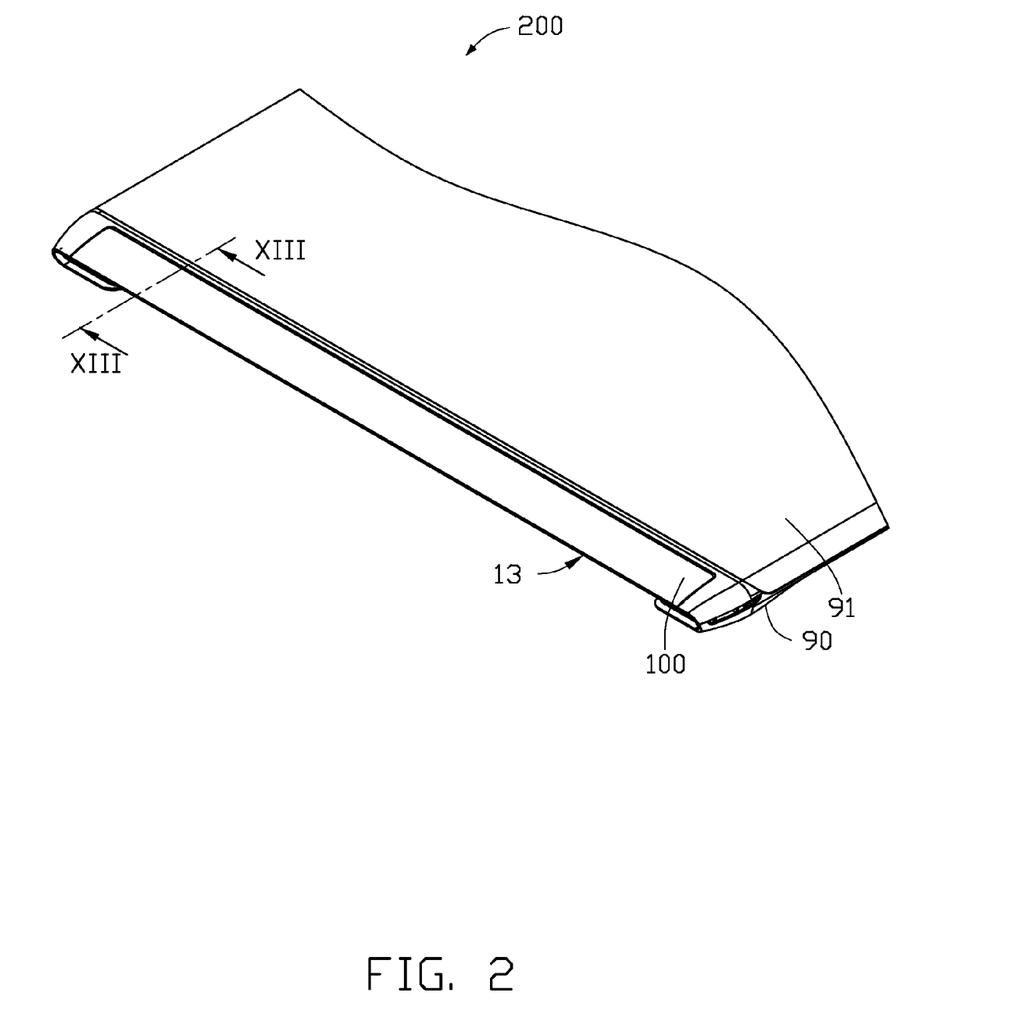
FIG. 2 is an isometric view of the ejecting apparatus of FIG. 1, when the I/O interfaces are hidden in the electronic device.
Figure 3:
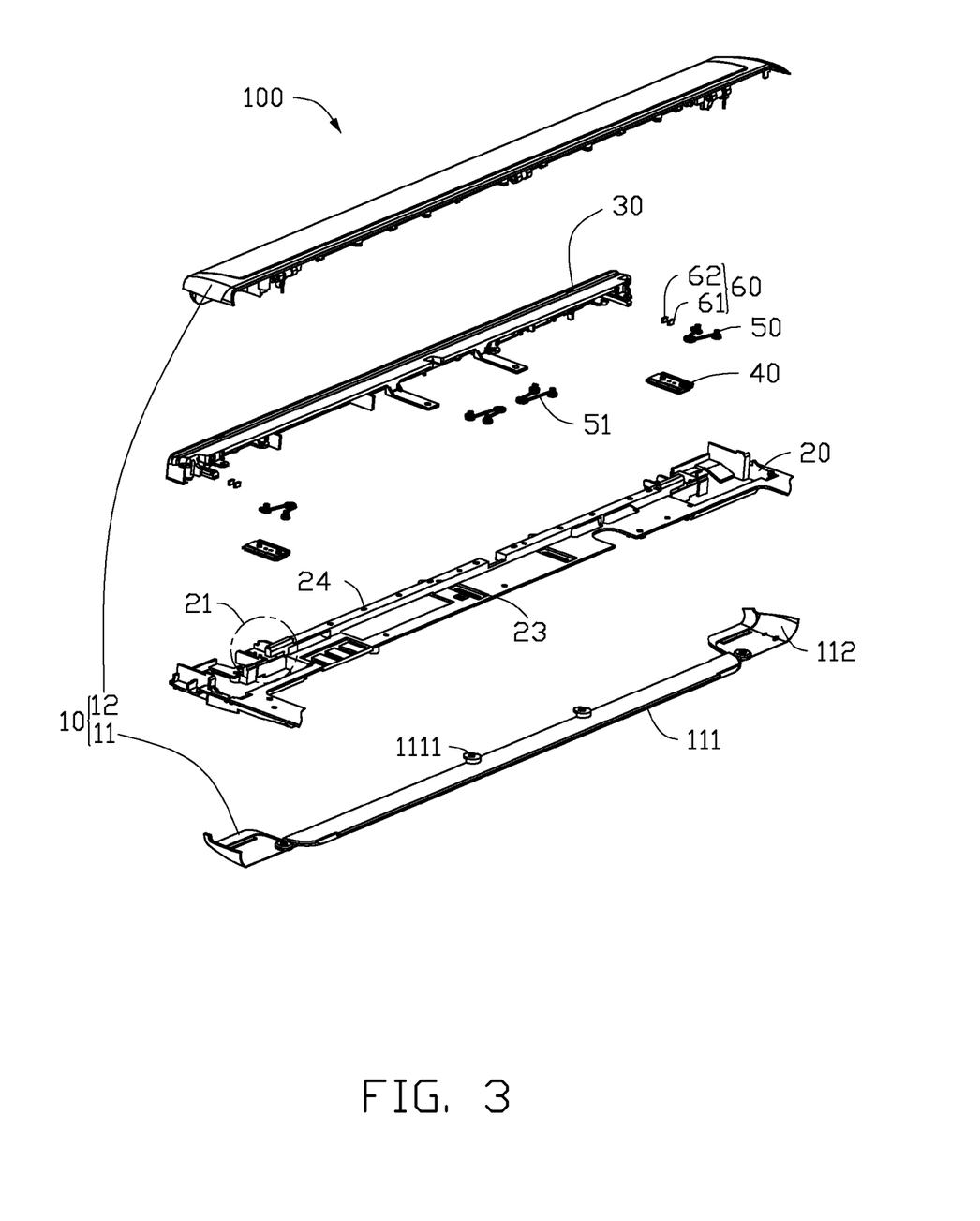
FIG. 3 is an exploded view of the ejecting apparatus including a top cover, a supporting member, a carrier, and a guiding member.

Referring to FIGS. 1-3, an electronic device 200 can include a main body 90, a lid 91, a plurality of input/output (I/O) interfaces 92, and an ejecting apparatus 100. In the embodiment, the electronic device 200 can be a notebook or other similar device. The I/O interfaces can be USB interfaces, HDMI interfaces, or other interfaces. The lid 91 rotatably connects with one side of the main body 90. The ejecting apparatus 100 can be fixed at a side of the main body 90, which can be connected to the lid 91. The plurality of I/O interfaces 92 can be exposed from or hidden in the ejecting apparatus 100.

The ejecting apparatus 100 can comprise an enclosure 10, a supporting member 20, a carrier 30, a guiding member 40, a first driving unit 50, and a second driving unit 60.

The enclosure 10 can comprise a bottom cover 11 and a top cover 12. The bottom cover 11 and the top cover 12 cooperatively define a receiving space 13 to receive the carrier 30. The bottom cover 11 can comprise a first body 111 and two sidewalls 112. The two sidewalls 112 extend toward the top cover 12 from opposite sides of the first body 111.

Figure 4:
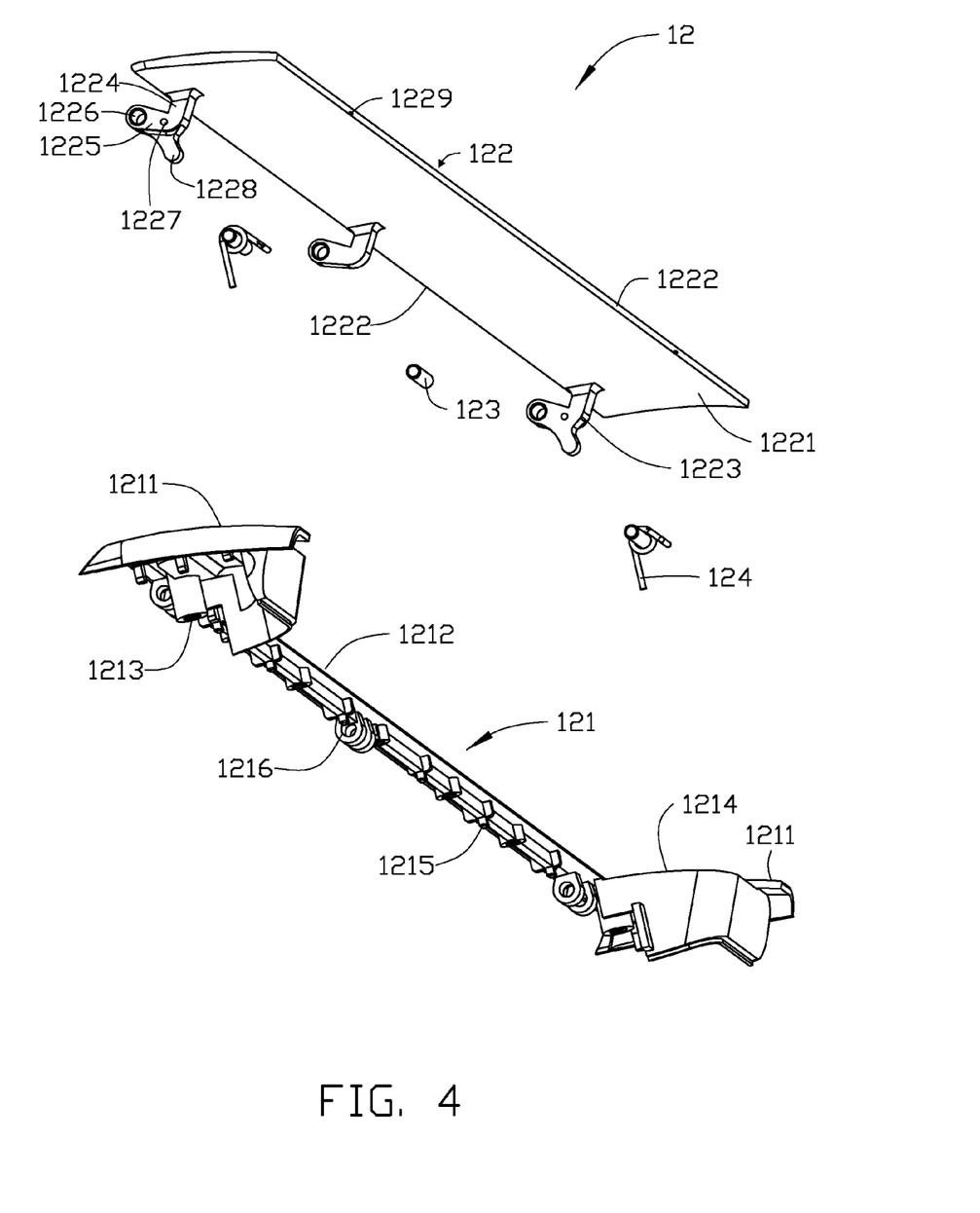
FIG. 4 is an exploded view of the top cover of FIG. 3.
Figure 5:
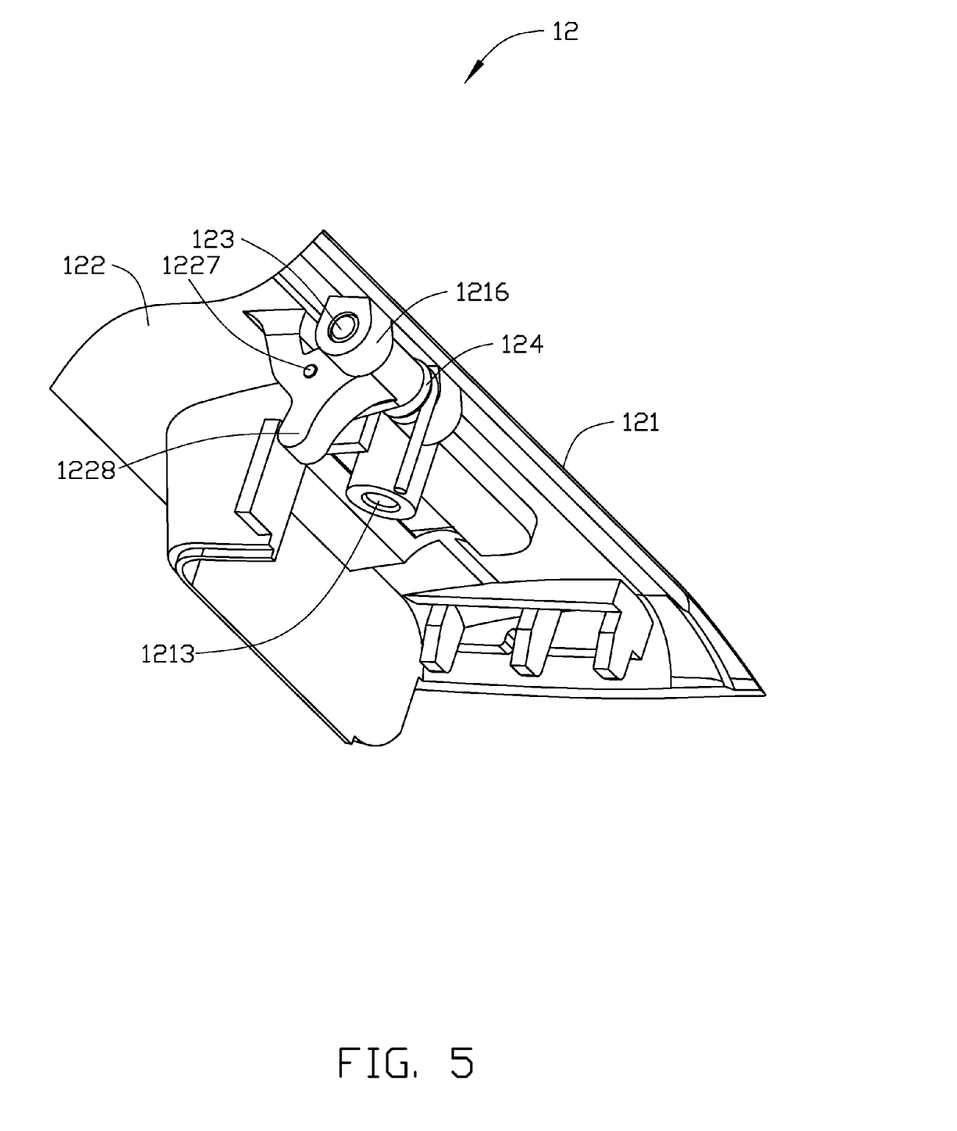
FIG. 5 is an enlarged, isometric view of some components of the ejecting apparatus of FIG. 4.

Referring to FIG. 4 and FIG. 5, the top cover 12 can comprise a second body 121, a rotary portion 122, a pivot 123, and a torsion spring 124. The second body 121 can comprise two supporting portions 1211 and a connection portion 1212 arranged between the two supporting portions 1211. A first screw hole 1213 can be defined in each supporting portion 1211 facing the bottom cover 11. The supporting portions 1211 can be fixed on the bottom cover 11 via screws (not shown). A supporting surface 1214 can be formed on a side of each supporting portion 1211 away from the bottom cover 11. A plurality of second screw holes 1215 and a plurality of first pivot holes 1216 can be defined in the connecting portion 1212.

The rotary portion 122 can comprise a bottom surface 1221 and two flanges 1222. A plurality of pivot parts 1223 can be arranged on the bottom surface 1221 corresponding to the plurality of first pivot holes 1216. In the embodiment, each pivot part 1223 can be substantially L-shaped and can comprise a first extension part 1224 extending from the bottom surface 1221, and a second extension part 1225 extending from an end of the first extension part 1224. A second pivot hole 1226 can be defined in each second extension part 1225. A first fixing hole 1227 can be defined adjacent to each second pivot hole 1226, and a push arm 1228 extends from each of two pivot parts 1223 adjacent to two ends of the rotary portion 122. The first fixing hole 1227 can be defined in a joining portion of the first extension part 1224 and the second extension part 1225. The push arm 1228 can extend from the joint part of the first extension part 1224 and the second extension part 1225. A plurality of position blocks 1229 can be arranged on one flange 1222 at a side edge of the rotary portion 122 away from the pivot parts 1223.

Each pivot 123 can be received into the first pivot hole 1216 and the second pivot hole 1226. Thus, the rotary portion 122 can be capable of rotating with the second body 121. The first torsion spring 124 can be sleeved on the pivot 123. One end of the first torsion spring 124 can be received into the first fixing hole 1227. When the rotary portion 122 is rotated away from the supporting surface 1214, the first torsion spring 124 can be deformed. When the rotary portion 122 is not rotated away from the supporting surface 1214, the first torsion spring 124 biases the rotary portion 122 to cover the supporting surface 1214.

Figure 6:
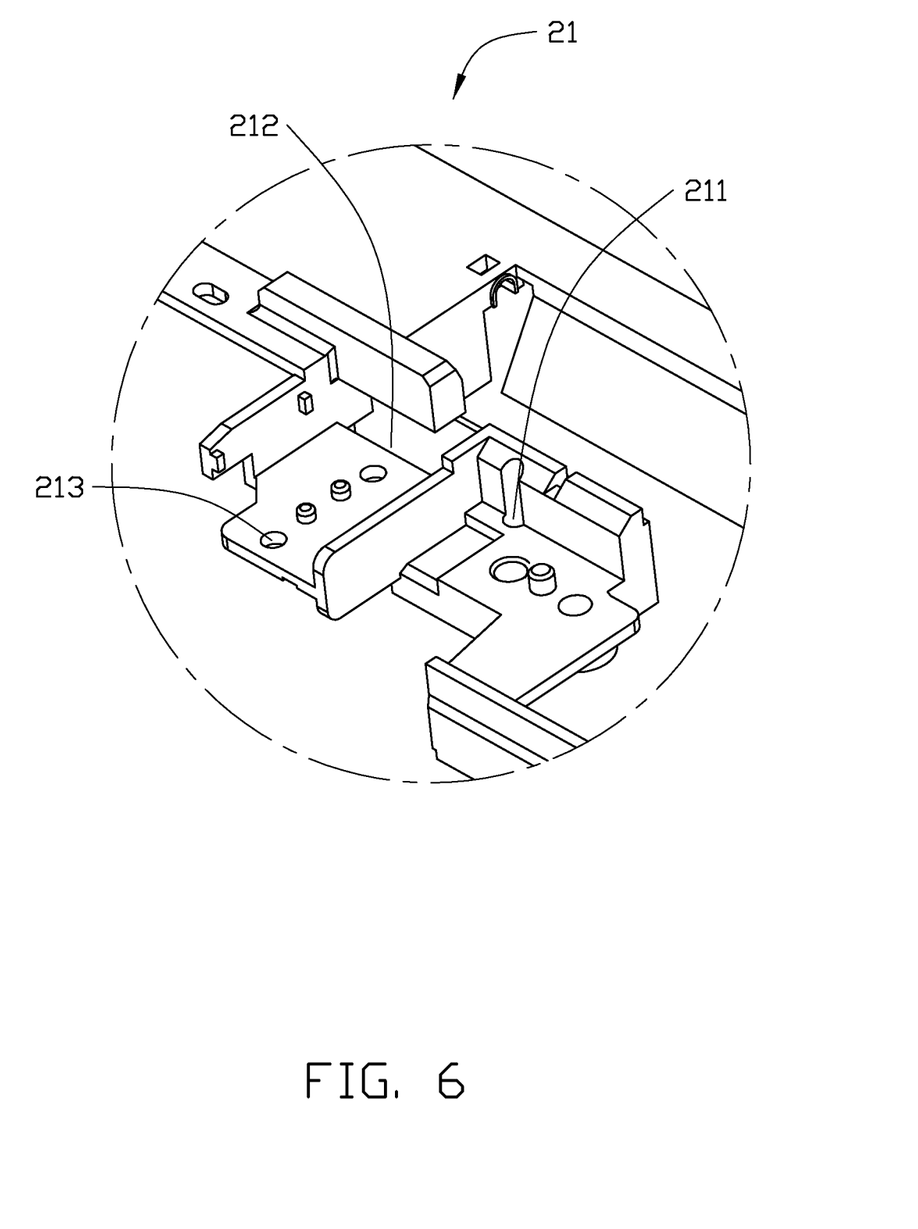
FIG. 6 is a partial enlarged view of the supporting member of FIG. 3.
Figure 7:
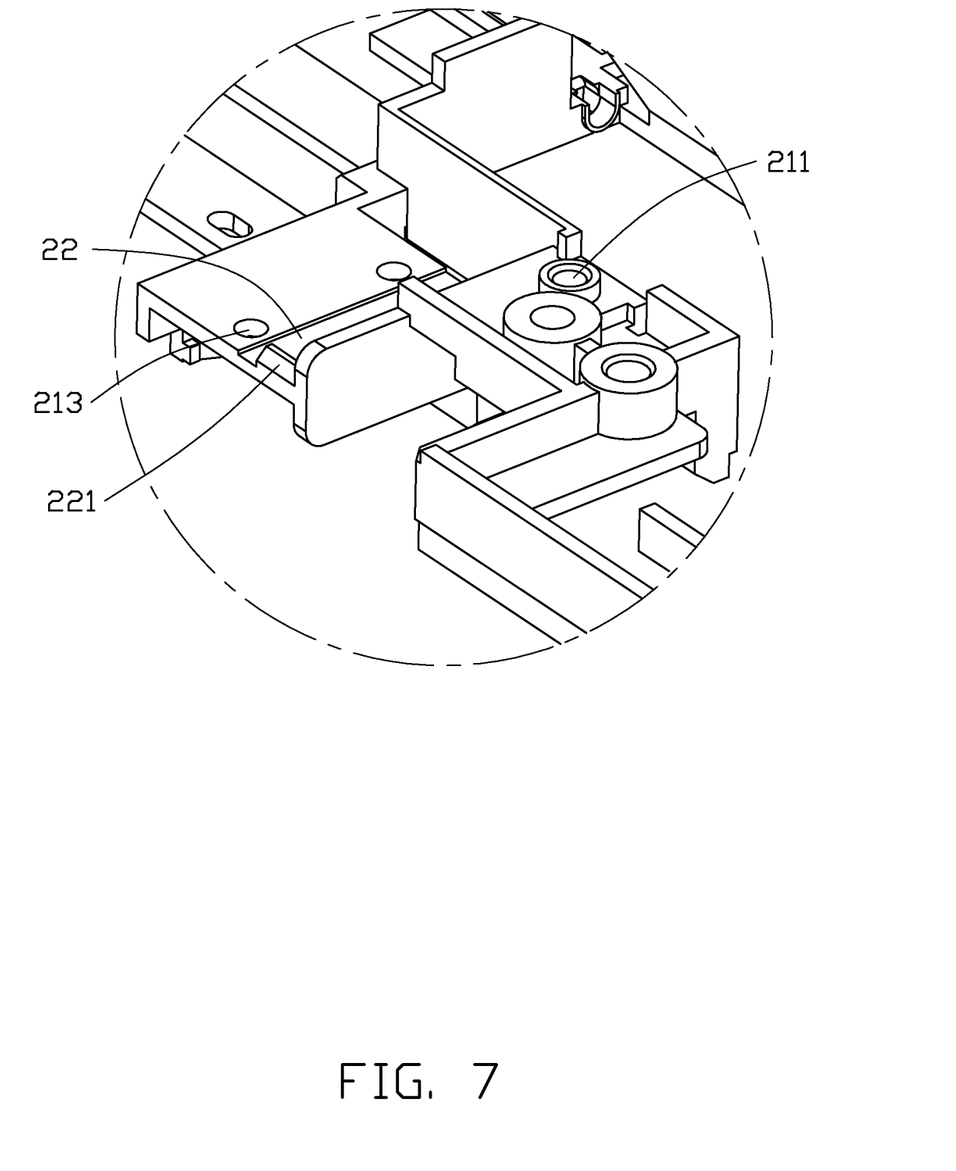
FIG. 7 is similar to FIG. 6, but showing the supporting member from another aspect.

Referring to FIGS. 3, 6, and 7, the supporting member 20 can comprise two first securing portions 21, two first limiting grooves 22, two second limiting grooves 23, and a plurality of third screw holes 24. The two first securing portions 21 can be secured on two ends of the supporting member 20. Each first securing portion 21 defines a second fixing hole 211, a latching piece 212, and a fourth screw hole 213. The other end of the first torsion spring 124 is securely received in the second fixing hole 211. The two first limiting grooves 22 can be arranged at two opposite ends of the supporting member 20. Each first limiting groove 22 can be rectangular. One end portion of the first limiting groove 22 comprises a first convex stage 221. The two second limiting grooves 23 can be defined in a substantially middle part of the supporting member 20. The plurality of third screw holes 24 correspond to the first through holes 1111 and the second screw holes 1215. The supporting member 20 can be secured on the top cover 12 via a plurality of screws passing through the third screw holes 24 and the second screw holes 1215.

Figure 8:
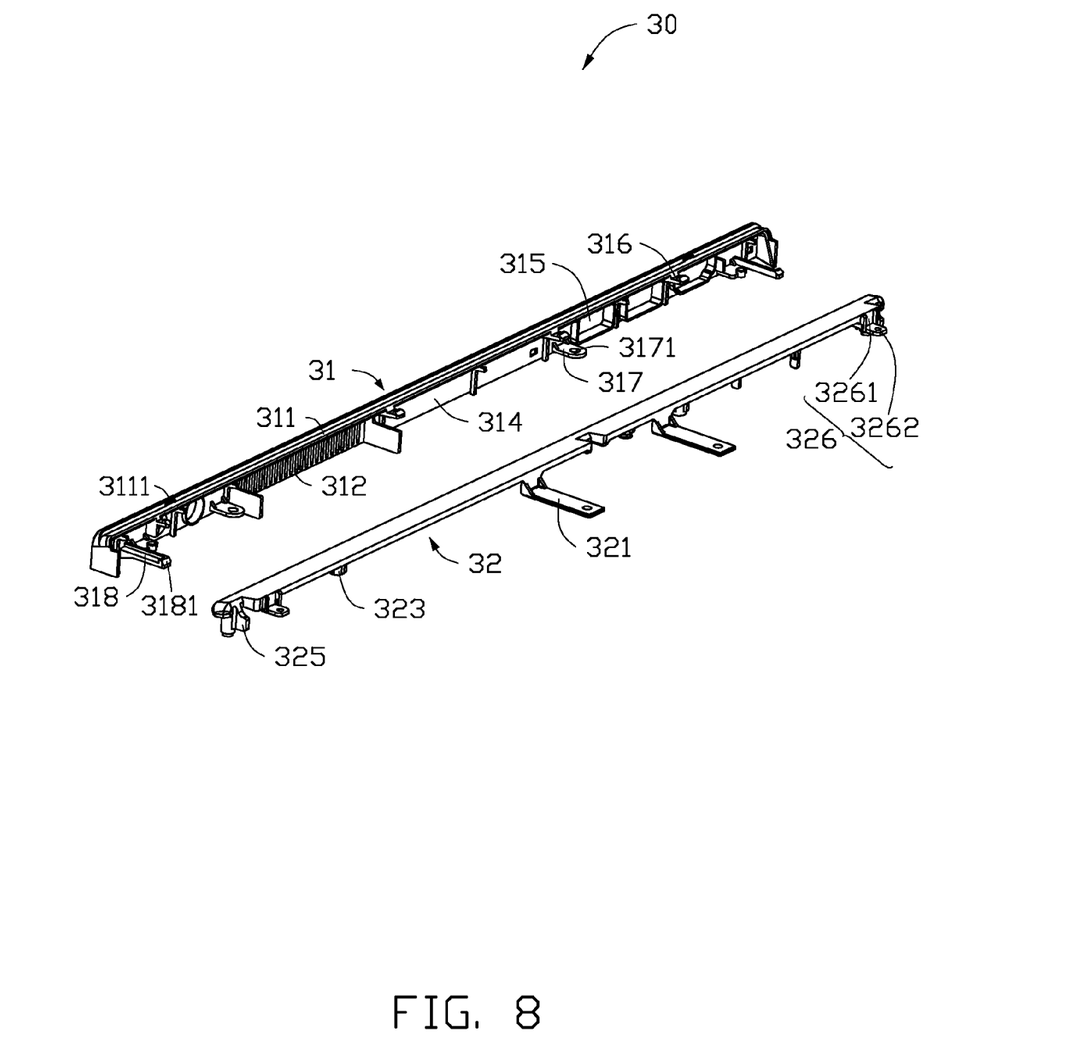
FIG. 8 is an exploded view of the carrier of FIG. 3.
Figure 9:
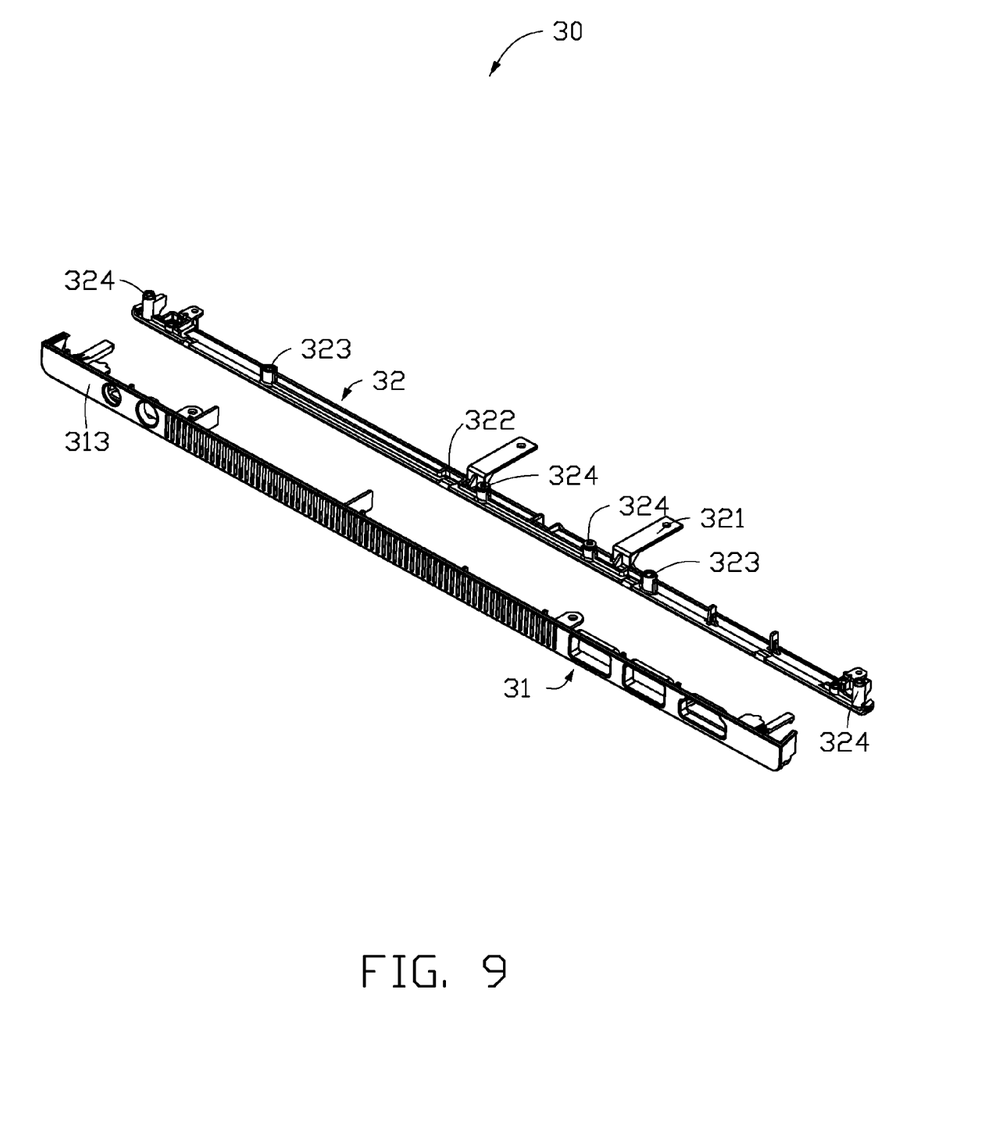
FIG. 9 is similar to FIG. 8, but showing the carrier from another aspect.

Referring to FIG. 8 and FIG. 9, the carrier 30 can be slidably mounted on the supporting member 20. The carrier 30 supports the I/O interfaces 92 to drive the I/O interfaces 92 out of or into the enclosure 10. The carrier 30 can comprise a first carrying portion 31 and a second carrying portion 32. The first carrying portion 31 can comprise a top flange 311, a bottom flange 312, a front surface 313, and a back surface 314 opposite to the front surface 313. A plurality of position grooves 3111 can be defined on the top flange 311 at intervals. Each position groove 3111 corresponds to one position block 1229. A plurality of second through holes 315 can be defined through the front surface 313 and the back surface 314. Each second through hole 315 and the I/O interface 92 can be similarly shaped. A plurality of hooks 316 extend from the top flange 311 adjacent to the back surface 314. A plurality of extension boards 317 extend from the top flange 311 adjacent to the front surface 313. Each extension board 317 defines a third through hole 3171. A first limiting arm 318 extends from the back surface 314 at each of two opposite ends of the first carrying portion 31. A length of the first limiting arm 318 can be substantially the same as a length of the first limiting groove 22. A second convex stage 3181 can be arranged at a distal end of each first limiting arm 318. The first limiting arm 318 and the supporting member 20 limit a sliding distance of the carrier 30.

A length of the second carrying portion 32 can be substantially the same as a length of the first carrying portion 31. The second carrying portion 32 comprises two second limiting arms 321, a latching piece 322, a fifth screw hole 323, a plurality of position columns 324, two resisting parts 325, and two securing parts 326. Each second limiting arm 321 corresponds to one limiting groove 23. The second limiting arm 321 can be received into the second limiting groove 23. The hook 316 faces the latching piece 322. The fifth screw hole 323 faces the third through hole 3171. The second carrying portion 32 can be secured on the first carrying portion 31 via a plurality of screws passing through the third through hole 3171 and the fifth screw hole 323. The hook 316 latches in the latching piece 322. The two resisting parts 325 can be arranged at two opposite ends of the second carrying portion 32 corresponding to the push arms 1228. When the rotary portion 122 rotates away from the second body 121, the two push arms 1228 resist the resisting portions 325. The two second securing parts 326 can be arranged at two opposite ends of the second carrying portion 32. Each second securing part 326 defines a second latching piece 3261 and a sixth screw hole 3262.

Figure 10:
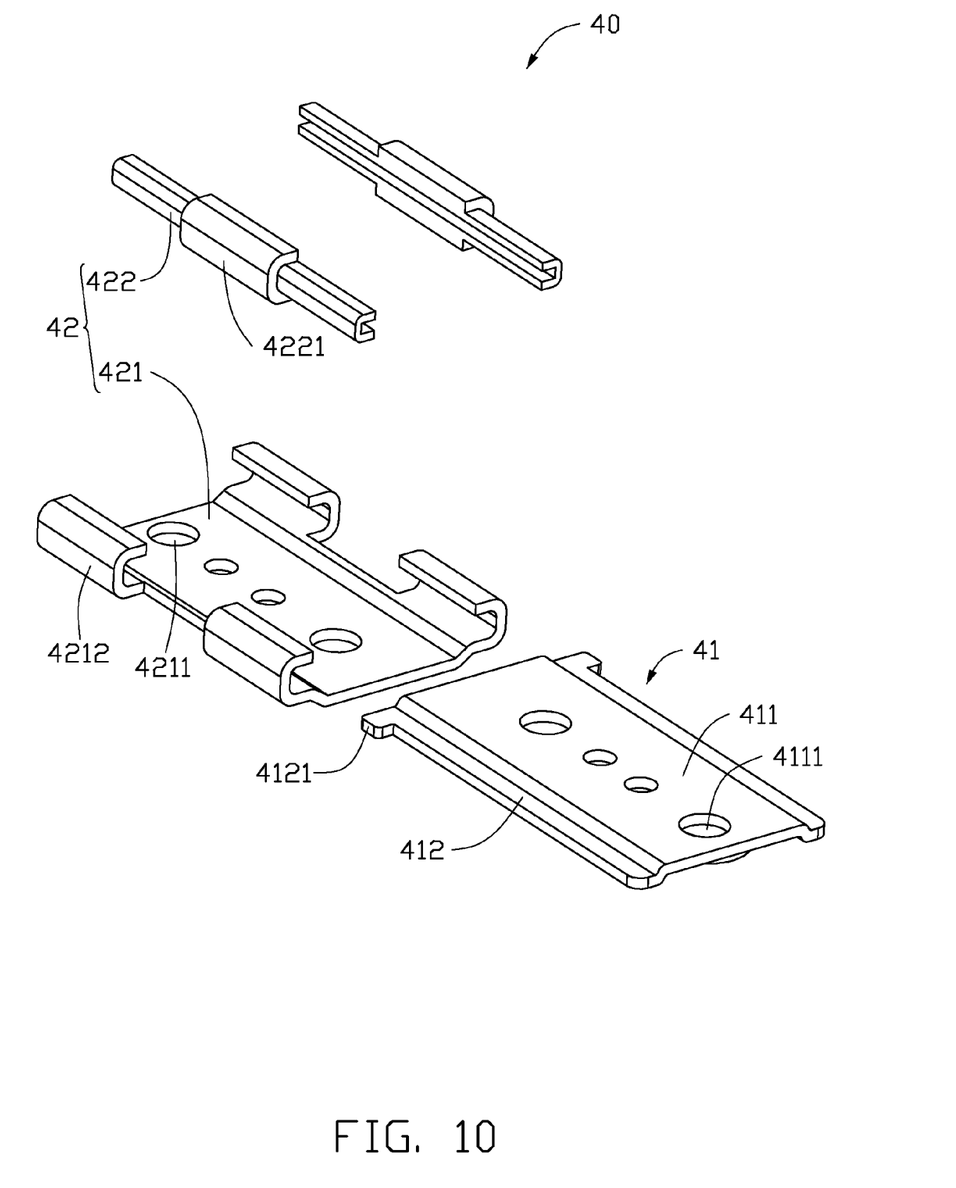
FIG. 10 is an exploded view of the guiding member of FIG. 3.

Referring to FIG. 10, the guiding member 40 limits a sliding direction of the carrier 30. The guiding member 40 comprises a first guiding portion 41 and a second guiding portion 42. The first guiding portion 41 comprises a third body 411 and a sliding part 412. A fourth through hole 4111 can be defined in the third body 411. The first guiding portion 41 can be secured on the second carrying portion 32 via a screw passing through the fourth through hole 4111 and the sixth through hole 3262. The sliding part 412 extends from two opposite sides of the third body 411. A stopper portion 4121 can be arranged at one end portion of the sliding part 412. The second guiding portion 42 can comprise a fourth body 421 and a sliding block 422 latched in the fourth body 421. A fifth through hole 4211 can be defined in the fourth body 421, and four latching pieces 4212 are arranged at each side of the fourth body 421. The fourth body 421 can be secured on the first securing portion 21 via a screw passing through the fifth through hole 4211 and the fourth through hole 213. Each latching piece 4212 can be substantially U-shaped. A protruding wall 4221 can be arranged at a substantially middle part of each sliding block 422. The sliding block 422 can be latched by a corresponding latching piece 4212. The sliding portion 412 can be capable of sliding along the sliding blocks 422.

The first driving unit 50 drives the carrier 30 to slide towards the supporting member 20 along a first direction, to expose the I/O interfaces 92 from the enclosure 10. The first driving unit 50 can comprise a plurality of second torsion springs 51. One end of each second torsion spring 51 can be fixed in the corresponding position column 324, and the other end of each second torsion spring 51 can be fixed in the corresponding third screw hole 24. When the plurality of second torsion springs 51 is compressed, the plurality of second torsion springs 51 drives the carrier 30 to slide along the first direction parallel to the guiding member 40.

The second driving unit 60 drives the carrier 30 to slide towards the supporting member 20 along a second direction, to hide the I/O interfaces 92 in the enclosure 10. The second driving unit 60 comprises a first magnet 61 and a second magnet 62 corresponding to the first magnet 61. The first magnet 61 can be secured in the first latching piece 212, and the second magnet can be secured in the second latching piece 3261. The first magnet 61 attracts the second magnet 62 to drive the carrier to slide along the second direction.

When the second driving unit 60 is assembled, the first magnet 61 is secured in the supporting member 20, and the second magnet 62 is secured in the carrier 30. Then the guiding member 40 can be assembled, when the first guiding portion 41 is latched onto the second securing portion 326, and the second guiding portion 42 is latched onto the first securing portion 21. The first diving unit 50 can be assembled when the two ends of the plurality of second torsion springs 51 are fixed in the supporting member 20 and the carrier 30, respectively. Then, the carrier 30 is slidably fixed onto the supporting member 20, such that the first limiting arm 318 is latched into the first limiting groove 22, and the second limiting arm 321 is latched into the second limiting groove 23. The supporting member 20 is latched into the connecting portion 1212, and the other end of the torsion spring 124 is inserted into the second fixing hole 211. At last, the top cover 12 is latched in the bottom cover 11, and the supporting member 20 is latched in the bottom cover 11.

Figure 11:
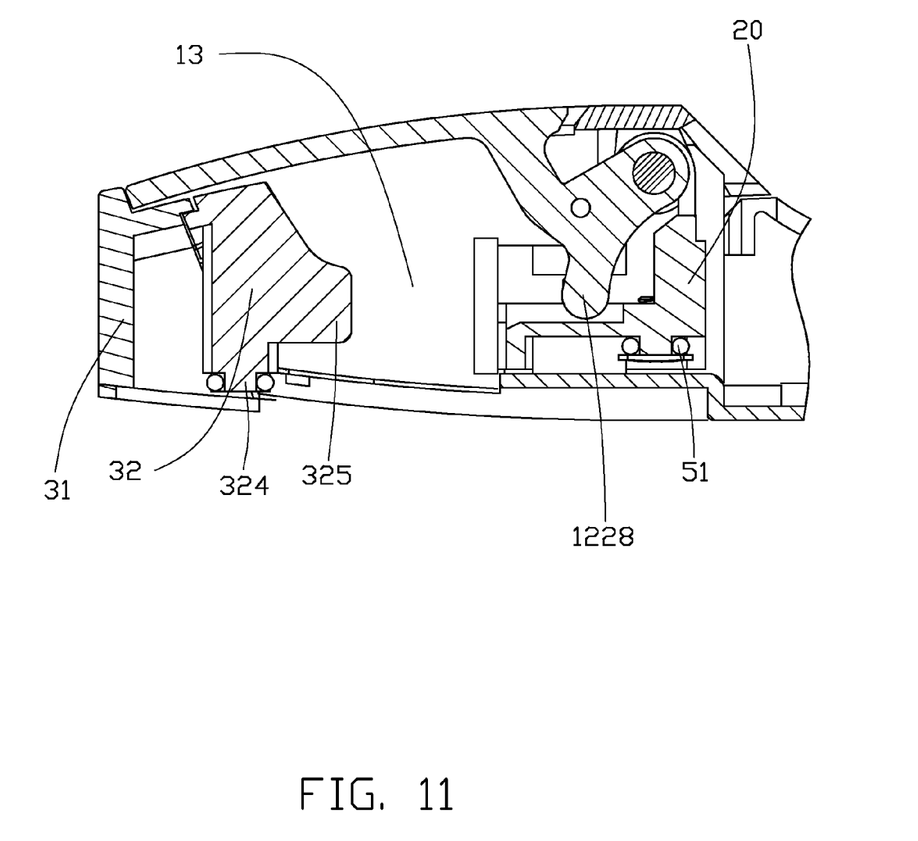
FIG. 11 is a sectional view of FIG. 1 taken along line XI-XI.

Referring also to FIG. 11, when the I/O interfaces are exposed from the enclosure, a first force provided by the plurality of second torsion springs 51 is larger than a second force provided by the first magnet and the second magnet. The first limiting arm latches into the first limiting groove, the second limiting arm latches into the second limiting groove. Thus, the carrier 30 is fixed relative to the supporting member 20. The rotary portion covers the supporting surface by driving of the first torsion spring 20. One flange of the rotary portion departs from the pivot part resists the top flange of the first carrying portion, and the position block latches into the position groove of the top flange.

Figure 12:
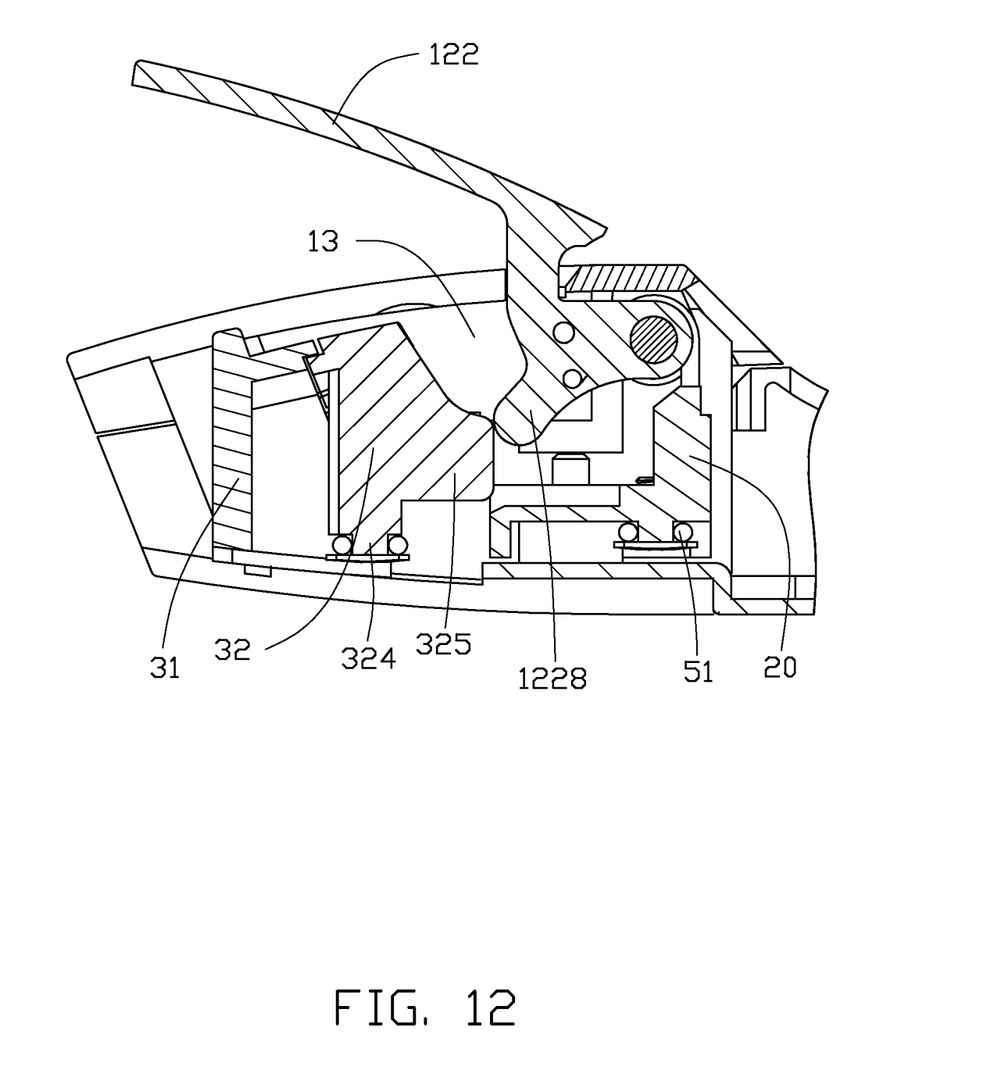
FIG. 12 is a sectional view of FIG. 2 taken along line XIII-XIII.
Figure 13:
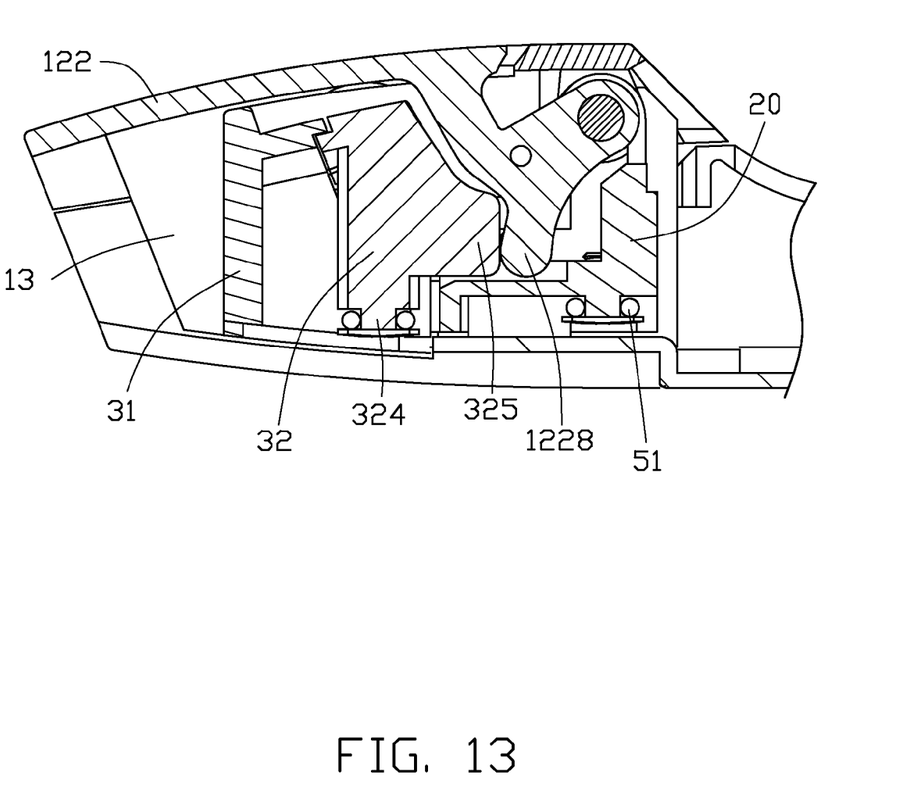
FIG. 13 is similar to FIG. 12, but showing the I/O interfaces in a hidden state.

Referring also to FIG. 12 and FIG. 13, when the rotary portion 122 is opened, the carrier can be driven to slide to a first position where the second force is larger than the first force along the second direction. At this time, the rotary portion 122 covers the supporting surface. The carrier is driven to slide towards the receiving space 13 by the second force. When the first magnet contacts the second magnet, the push arm 1228 resists the resisting portion 325. Thus, the I/O interfaces are received in the enclosure.

When the I/O interfaces 92 are used, the rotary portion 122 is open, and the push arm 1228 drives the carrier to slide to a second position where the second force is less than the first force. When the first limiting arm 318 latches into the first limiting groove 22, and the second limiting arm 321 latches into the second limiting groove 23, the carrier 30 can be mounted onto the supporting member 20, and the rotary portion 122 is released to cover the supporting surface 1214. Thus, the I/O interfaces 92 can be exposed from the enclosure 10.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. An electronic device, comprising:
   a main body;
   a plurality of I/O interfaces and an ejecting apparatus mounted on the main body;
   the ejecting apparatus comprising:
      an enclosure;
      a supporting member received in the enclosure;
      a carrier slidably mounted on the supporting member to support the plurality of I/O interfaces;
      a first driving unit driving the carrier to slide along a first direction to make the plurality of I/O interfaces expose from the enclosure; and
      a second driving unit driving the carrier to slide along a second direction opposite to the first direction to receive the plurality of I/O interfaces in the enclosure.

2. The electronic device of claim 1, wherein the first driving unit comprises a plurality of torsion springs, one end of each torsion spring is fixed in the enclosure, and the other end of each torsion spring is fixed in the carrier; when the plurality of torsion springs are compressed, the plurality of torsion springs drive the carrier to slide along the first direction.

3. The electronic device of claim 1, wherein the second driving unit comprises a first magnet secured in the enclosure and a second magnet secured in the carrier corresponding to the first magnet; when the plurality of I/O interfaces are received in the enclosure, the first magnet contacts the second magnet.

4. The electronic device of claim 1, wherein two limiting grooves are arranged on two opposing ends of the supporting member corresponding to two limiting arms arranged on the carrier; when the plurality of I/O interfaces are exposed from the enclosure, the two limiting arms are latched into the two limiting grooves.

5. The electronic device of claim 1, wherein the enclosure comprises a bottom cover and a top cover, the bottom cover and the top cover cooperatively define a receiving space to receive the carrier, the top cover comprises a first body and a rotary portion pivotly connected with the first body, a push arm is arranged on the rotary portion, the rotary portion is operated to rotate with the first body, and the push arm pushes the carrier to slide along the first direction.

6. The electronic device of claim 5, wherein a protruding wall is arranged on the carrier, the rotary portion further comprises a flange; when the plurality of I/O interfaces are exposed from the enclosure, the protruding wall resists the flange.

7. The electronic device of claim 6, wherein when the carrier is received in the receiving space, the rotary portion covers the carrier.

8. The electronic device of claim 5, wherein a protruding wall is arranged on the carrier, the rotary portion further comprises a flange; when the plurality of I/O interfaces are exposed from the enclosure, the protruding wall resists the flange.

9. An ejecting apparatus for supporting a plurality of I/O interfaces of an electronic device, comprising:
   an enclosure;
   a supporting member received in the enclosure;
   a carrier slidably mounted on the supporting member to support the plurality of I/O interfaces;
   a first driving unit driving the carrier to slide along a first direction to expose the plurality of I/O interfaces expose from the enclosure; and
   a second driving unit driving the carrier to slide along a second direction opposite to the first direction to receive the plurality of I/O interfaces in the enclosure.

10. The ejecting apparatus of claim 9, wherein the first driving unit comprises a plurality of torsion springs, one end of each torsion spring is fixed in the enclosure, and the other end of each torsion spring is fixed in the carrier; when the plurality of torsion springs are compressed, the plurality of torsion springs drive the carrier to slide along the first direction.

11. The ejecting apparatus of claim 9, wherein the second driving unit comprises a first magnet secured in the enclosure and a second magnet secured in the carrier corresponding to the first magnet; when the plurality of I/O interfaces are received in the enclosure, the first magnet contacts with the second magnet.

12. The ejecting apparatus of claim 9, wherein two limiting grooves are arranged on two opposing ends of the supporting member corresponding to two limiting arms arranged on the carrier; when the plurality of I/O interfaces are exposed from the enclosure, the two limiting arms are latched into the two limiting grooves.

13. The ejecting apparatus of claim 9, wherein the enclosure comprises a bottom cover and a top cover, the bottom cover and the top cover cooperatively define a receiving space to receive the carrier, the top cover comprises a first body and a rotary portion pivotly connected with the first body, a push arm is arranged on the rotary portion, the rotary portion is operated to rotate with the first body, and the push arm pushes the carrier to slide along the first direction.

14. The ejecting apparatus of claim 13, wherein a protruding wall is arranged on the carrier, the rotary portion further comprises a flange; when the plurality of I/O interfaces are exposed from of the enclosure, the protruding wall resists the flange.

15. The ejecting apparatus of claim 14, wherein when the carrier is received in the receiving space, the rotary portion covers the carrier.

16. An electronic device, comprising:
   a main body;
   a plurality of I/O interfaces and an ejecting apparatus mounted on the main body;

the ejecting apparatus comprising:
an enclosure;
a supporting member received in the enclosure;
a carrier slidably mounted on the supporting member to support the plurality of I/O interfaces;
a first driving unit providing a first force to drive the carrier to slide along a first direction; and
a second driving unit providing a second force to drive the carrier to slide along a second direction opposite to the first direction; and
wherein when the plurality of I/O interfaces expose from the enclosure, the first force is larger than the second force; when the carrier is operated to slide to a position where the second force is larger than the first force, the plurality of I/O interfaces are driven to be received in the enclosure.

17. The electronic device of claim 16, wherein the first driving unit comprises a plurality of torsion springs, one end of each torsion spring is fixed in the enclosure, and the other end of each torsion spring is fixed in the carrier; when the plurality of torsion springs are compressed, the plurality of torsion springs drive the carrier to slide along the first direction.

18. The electronic device of claim 16, wherein the second driving unit comprises a first magnet secured in the enclosure and a second magnet secured in the carrier corresponding to the first magnet; when the plurality of I/O interfaces are received in the enclosure, the first magnet contacts with the second magnet.

19. The electronic device of claim 16, wherein two limiting grooves are arranged on two opposing ends of the supporting member corresponding to two limiting arms arranged on the carrier; when the plurality of I/O interfaces are exposed out of the enclosure, the two limiting arms are latched into the two limiting grooves.

20. The electronic device of claim 16, wherein the enclosure comprises a bottom cover and a top cover, the bottom cover and the top cover cooperatively define a receiving space to receive the carrier, the top cover comprises a first body and a rotary portion pivotly connected with the first body, a push arm is arranged on the rotary portion, the rotary portion is operated to rotate with the first body, and the push arm pushes the carrier to slide along the first direction.

* * * * *